Patented July 15, 1947

2,423,972

UNITED STATES PATENT OFFICE 2,423,972

OLEYL ESTERS OF SULPHOBENZOIC ACIDS

Earl W. Gluesenkamp, Centerville, and Milton Kosmin, Dayton, Ohio, assignors to Monsanto Chemical Company, St. Louis, Mo., a corporation of Delaware No Drawing. Application February 3, 1944, Serial No. 520,952

2 Claims. (Cl. 260—470)

This application is a continuation-in-part of our copending application Serial No. 335,117, filed May 14, 1940, now Patent No. 2,359,291, and relates to esters of sulfobenzoic acids and to the application of the same for the treatment of fibrous materials.

In the copending application referred to above, we described a series of organic compounds which may be designated generally as higher esters of sulfobenzoic acids. Compounds therein contemplated are alkyl or alkylene esters of mono-carboxylic aromatic sulfonic acids and salts thereof having the general formula:

$$ROOC-Ar-(SO_3Y)_m$$
$$\phantom{ROOC-Ar-(}X_n$$

in which Ar is an aryl nucleus derived from hydrocarbons such as benzene, naphthalene, diphenyl and the like; X is a substituent such as hydrogen, hydroxyl, halogen or a similar radical; Y is hydrogen or an alkali-metal, such as sodium, potassium, ammonium, an alkaline earth metal such as calcium, barium or magnesium or a polyvalent metal such as titanium or zirconium; $n$ and $m$ are whole numbers which may be one or a greater number, indicating that the compounds are mono- or polysulfonated or mono- or polyhalogenated or hydroxylated; and R is an alkyl radical having from 8 to 18 carbon atoms. The group X may be substituted in any of the various positions of the aromatic nucleus; thus, in the case of benzene, it may be ortho-, meta-, or para- to the carboxyl group. The compounds of our prior application contain a single alkyl substituent which is attached as an esterifying group to the carboxyl group of the aromatic carboxy sulfonic acid.

We have now found that when R is an aliphatic 18 carbon chain (saturated or unsaturated) valuable textile treating agents are obtained.

Compounds corresponding to the generic formula hereinabove and the method of naming them is exemplified by reference to the specific compound denominated, octadecyl meta-sodium sulfobenzoate, which has the formula:

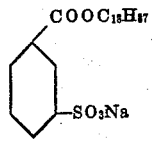

The naming of the other compounds follows this system of nomenclature, the aliphatic substituent being understood to be on the carboxyl group and the salt-forming metal being understood to be on the sulfonic acid radical, whereas the positions, ortho, meta, and para refer to the relative positions of the carboxyl and sulfonic acid radicals with respect to each other in the benzene nucleus where these positions are known and indicated.

The compounds of the invention are preferably prepared by reacting an alcohol with the sulfonated aromatic acid or its anhydride or acid chloride. Thus, an octadecyl ester of ortho-sulfobenzoic acid may be prepared by reacting octadecyl alcohol (which may be derived by hydrogenation of stearic acid esters) with ortho-sulfobenzoic acid anhydride. Other known methods of synthesis may, however, be used. Thus, for example, benzoic acid may be esterified with octadecyl alcohol and the resulting octadecyl benzoate may thereafter be sulfonated. This latter procedure, when not carefully controlled, leads to the production of by-products which render the purification of the resulting octadecyl ester of sulfobenzoic acid difficult. The simple alkyl or alkylene esters of mono-carboxylic aromatic sulfonic acids, if contaminated with by-products, can be further purified by crystallization from aqueous solution and when thus purified are substantially odorless and tasteless products. By controlling carefully the esterification reaction, products requiring no further extensive purification treatment may be obtained, however.

The alkali metal and ammonium salts of compounds having the general formula disclosed in our issued patent above referred to exhibit water solubility and a high order of surface activity. They are useful for general purposes of wetting agents, detergents, foaming and emulsifying agents and are of advantage for use in dyeing processes, textile treating processes, in ore flotation, for breaking petroleum emulsions, in plaster, cement and ceramic mixes, as dispersing agents for germicides and insecticides, in printing inks and for similar uses. Of course, no single compound shows all these properties to a marked degree. A good wetting agent is not necessarily the best detergent or best textile softening agent. It is an advantage of this group of compounds that by a selection of the proper chain length and configuration for the alkyl or alkylene chain, an agent possessing a particular property to a marked degree can be obtained.

The present application is directed specifically to those compounds of the general type herein disclosed in which the aliphatic chain is one of 18 carbon atoms and which are particularly good treating agents for fibrous materials. Such an aliphatic chain may be derived by reacting sulfobenzoic acid or its acyl halide or anhydride with octadecyl alcohol. Use of an acyl halide like $ClO_2S.C_6H_4COOH$ in the presence of pyridine gives the present type of esters because rearrangement occurs during esterification to give $HO_3S.C_6H_5.COOR$ products. Suitable esters may be prepared by reaction of a saturated or unsaturated 18 carbon atom alcohol, particularly with sulfobenzoic or sulfosalicylic acid. The 18 carbon atom alcohols may be prepared by reducing the corresponding fatty acid or mixtures containing the same with hydrogen under conditions whereby the double bond is not saturated. In most cases the unsaturated alcohol may be prepared by the reduction of the corresponding lower ester, e. g., methyl or ethyl ester of the fatty acid by means of sodium in an alcohol such as butanol.

In this way there may be prepared the following alcohols: oleyl, elaidyl, linoleyl, linolenyl, eleostearyl and stearyl alcohols, which may be employed in the pure state, or as mixtures for the purpose of producing the herein described esters. By employing mixtures of these alcohols, the products obtained will be mixtures of esters, which mixtures are also of value for textile treating processes.

Esters of sulfobenzoic acid with saturated or unsaturated aliphatic alcohols of 18 carbon atoms may be readily converted to water-soluble alkali metal, alkaline earth metal or other metal salts by neutralization with the appropriate base. When aqueous solutions of such salts, say, in concentration of from 1% to 5% are applied to natural or artificial fibrous materials there results an improved softness, pliability and "hand" of the fibers. Treatment of fibers or fibrous materials including leather with the present esters enhances the feel of the products without in any way affecting the color or luster of the same. While substances heretofore proposed in the art for the softening of textiles or other fibrous materials have often imparted an unpleasant odor or a darkened color to the treated products, especially upon aging or heating, the present esters do not develop this undesirable effect. Textiles or other fibrous materials may be softened and also rendered water-repellent by first treating with the present water-soluble salts of the sulfobenzoates and then with a material which will convert said water-soluble salts into the corresponding insoluble salts, for example, the calcium, aluminum, titanium or zirconium salts. Materials which may be used for this subsequent treatment may be, for example, the hydroxides of calcium, aluminum, titanium or zirconium or salts of the same with weak acids such as the carbonates or the acetates. Also, instead of employing such a two-step process, the alkali-metal sulfobenzoates may first be converted to the water-insoluble salts and then applied to the fabric, for example, by means of an aqueous dispersion of the same. For the simultaneous production of a softening and water-repelling effect there may then be employed alkaline earth metal or heavy metal salts such as the salts of the present sulfobenzoates and polyvalent metals.

The invention is further illustrated, but not limited, by the following examples:

Example 1

Into a flask attached to a Stark and Dean moisture trap and a condenser are placed 60 grams of meta-sulfobenzoic acid, 74 grams of an alcohol known to the trade as "Ocenol" and consisting predominantly of oleyl alcohol, and 600 cc. of benzene. The benzene is added to aid in carrying over any water which is originally present and also that formed in the reaction. Toluene or xylenes may be used in place of benzene for this purpose. The charge in the flask is then heated to refluxing temperature or to a temperature of from 110° C. to 120° C., and heating is continued for 22 hours, or until evolution of reaction water has ceased. The sodium salt of the resulting ester is prepared by allowing the reaction product to cool, diluting it with water and making it slightly alkaline with 20% to 35% caustic soda. Upon further dilution of the neutralized product and drum drying there was obtained the slightly yellow, flaked oleyl meta-sodium sulfobenzoate which was subsequently evaluated for use as textile-softening agent by the following procedure.

A 6" x 50" strip of desized cotton 54 x 48 Batfast suiting was padded for 3 ends in a 2 per cent aqueous solution of the oleyl meta-sodium sulfobenzoate obtained above in a conventional padder. During the treatment the temperature of the padding solution was held at a temperature of from 200° F. to 210° F. The treated cloth was then allowed to dry at a temperature of 100° F. in a tentering frame and submitted to several empirical tests devised for evaluating softness and heat- and light-stability. The treated cloth, which showed a definite improvement in feel, pliability and softness by tactual test was further evaluted by means of the Planoflex, a device for evaluating the pliability of fabrics which is described on pages 15 to 19 of the American Society for Testing Materials Bulletin for January 1942, as well in Research Paper No. RP 1434 of the National Bureau of Standards or in the Journal of the National Bureau of Standards, 27, 469-477 (1941). This test depends upon the extent to which fabrics can be distorted in their own planes without producing wrinkles on their surface. Cloth treated as above described was found to undergo a considerable degree of additional distortion without wrinkling, which indicates that the treated cloth is considerably more pliable than the untreated material.

The effect of rapid heat on the treated cloth was tested by exposing the cloth to a temperature of 120° C. for intervals of 3 minutes and 5 minutes, at the end of which time the color of the heat-treated samples of the treated cloth was compared with the color of similarly heated samples of the corresponding untreated material. There was found to be no substantial difference in the color of the treated and untreated material, which fact shows that the present softening treatment has no deleterious effect on the color of the cloth when exposed to rapid heat.

The effect of prolonged heat was determined by maintaining samples of the treated material and of the untreated material in separate pint jars at a temperature of 200° F. for 16 days. Examination of the samples with respect to possible changes in color and development of odor was made at intervals of 1, 4, 7, 12 and 16 day periods, and it was found that the color of the untreated sample and that of the treated sample was substantially identical. Since no rancid odor was detectable in either test sample, no decomposition of the oleyl meta-sodium sulfobenzoate is indicated under the test conditions.

Light-stability of the present sulfobenzoates may be determined by exposing the treated swatch of cloth to ultra-violet light employing a General Electric Sunlamp, a Fadeometer, or a Weatherometer (in the absence of water). Upon exposure of the treated cloth to the rays of a General Electric Sunlamp for a period of 24 hours there was found to be substantially no change in color, which indicates no decomposition of the esters under the test conditions.

The above tests thus show that while oleyl meta-sodium sulfobenzoate increases the pliability and softness of a cotton suiting it has no deleterious effect upon the color either at ordinary temperatures or at increased temperatures, and that decomposition of the sulfobenzoate, as evidenced by the absence of any change in color of the material upon exposure to heat or light or by freedom from rancid odor, does not take place either upon prolonged heating, rapid heating or exposure to ultra-violet light.

*Example 2*

Octadecyl sodium meta-sulfobenzoate was prepared substantially according to the procedure used for the preparation of oleyl sodium meta-sulfobenzoate except that there were used 500 cc. of benzene, 24 grams of meta-sulfobenzoic acid and 30 grams of octadecyl alcohol and that the reaction mixture was allowed to reflux for a time of from 21 to 23 hours. The sodium salt which was obtained upon neutralization of the resulting product was found to be eminently suited for the treatment of taffeta in order to impart a soft "feel" and pliability to the same.

*Example 3*

A mixture consisting of 1 mol of meta-sulfobenzoic acid and 1 mol of Ocenol was heated with stirring at a temperature of 90–95° C. under a pressure of 50 mm. for one hour and then at a pressure of 185 mm. and a temperature of 75° C. to 80° C. for 45 minutes. After cooling, the charge was made slightly alkaline with 40% aqueous solution of sodium hydroxide, diluted to 2 liters, and drum dried to give 106.5 grams (87.5% yield) of slightly yellow, flaky product which consisted substantially of oleyl meta-sodium sulfobenzoate. Evaluation of the product as a textile softening agent according to the procedure described in Example 1, showed that the present material was fully as effective for this purpose as the ester of Example 1.

Other $C_{18}$ alcohols which may be employed for the preparation of esters which are eminently suited to the treatment of fibers and fibrous materials for the purpose of imparting pliability and softness to the same are alcohols which are obtainable by partial reduction of either methyl linoleate or ethyl oleostearate by treatment with sodium in the presence of an alcohol such as methanol, ethanol or butanol, the reduction products so obtained consisting essentially of linoleyl alcohol or eleostearyl alcohol, respectively. These may be reacted with meta-sulfobenzoic acid either at ordinary pressures or under partial vacuum substantially as described in the preceding examples for the preparation of the oleyl and the octadecyl esters. Also, instead of employing meta-sulfobenzoic acid, the other isomeric sulfobenzoic acids, i. e., ortho-sulfobenzoic acid or para-sulfobenzoic acid may be employed, the selection of the particular isomer having substantially no effect on the usefulness of the resulting esters as textile softening agents.

While an important use of the present esters lies in the treatment of fibers or textiles composed entirely or in large part of cellulose or cellulose derivatives, very good softening effects are also obtained when these materials are used for the treatment of animal fibers such as wool, silk or leather or artificial fibrous materials such as rayon, nylon, Vinyon, Saran, Arelac, etc. For example, a remarkable softening effect is obtained by the treatment of a rayon taffeta of the grade ordinarily used for linings with the present esters, the treatment of the taffeta substantially as described in Example 1 with oleyl meta-sodium sulfobenzoate resulting in such an increase of pliability that the "splitting" of the taffeta is prevented even after long use when subjected to friction.

Although in the above examples we have referred primarily to fiber treating compositions containing only esters of sulfobenzoic acid with $C_{18}$ alcohols, other materials may be added to the treating solution for the purpose of imparting additional modifying properties. Textile lubricants, for example, the lower alkyl phosphates, may be advantageously admixed with the present sulfobenzoates for the purpose of simultaneously effecting a softening and lubricating treatment.

The softening agents of the invention may be applied either to the finished products, for example, threads and textiles, or to the yarn previous to the spinning process.

Since esters of sulfobenzoic acids with $C_{18}$ alcohols are stable under both prolonged and rapid heating the fibrous materials which have been treated with aqueous solutions of the same may be oven-dried or baked instead of air-dried, as shown above. Moreover, the water-solubility of the present esters makes possible the application of the same in water solution. The esters may also be applied in solution in organic solvents, for example, in carbon tetrachloride. The use of organic solvent solutions of the treating agents is especially recommended for the treatment of such materials as leather.

What we claim is:
1. The oleyl ester of sulfobenzoic acid, in which the oleyl group is attached to the carboxy group.
2. Oleyl meta-sodium sulfobenzoate, in which the oleyl group is attached to the carboxy group.

EARL W. GLUESENKAMP.
MILTON KOSMIN.

REFERENCES CITED

The following references are of record in the file of this patent:

UNITED STATES PATENTS

| Number | Name | Date |
| --- | --- | --- |
| 2,208,808 | Fischer | July 23, 1940 |
| 1,935,264 | Felix | Nov. 14, 1933 |
| 2,255,316 | Harris | Sept. 9, 1941 |
| 2,088,674 | Whitehead | Aug. 3, 1937 |